3,075,850
DIBENZOYLRESORCINOL STABILIZER IN CELLULOSE ESTERS
Charles J. Kibler, M B Knowles, and John W. Tamblyn, Kingsport, Tenn., assignors to Eastman Kodak Company, Rochester, N.Y., a corporation of New Jersey
No Drawing. Filed Aug. 8, 1960, Ser. No. 47,940
6 Claims. (Cl. 106—187)

This invention is concerned with stabilized cellulose ester plastics. More particularly, it is concerned with cellulose ester plastics stabilized against weathering by the incorporation of dibenzoylrescorcinol.

Many methods are known for protecting cellulose ester plastics against weathering, particularly against the action of ultraviolet light found in sunlight. For instance, coating compositions have been applied to materials containing ultraviolet absorbers or inhibitors which would filter out the ultraviolet light. However, some ultraviolet inhibitors or absorbers have not had satisfactory results due to coloration of the plastics, incompatibility, and the like. Certain of these inhibitors tend to evaporate or exude from the plastic material so that after one or two months of outdoor exposure in a sunny climate, the plastic becomes brittle.

We have found that dibenzoylresorcinol is especially effective in stabilizing cellulose ester plastics against deterioration due to ultraviolet light. One object of this invention is to provide a material which can be incorporated in cellulose ester plastic materials and which will stabilize the cellulose ester against deterioration from ultraviolet light. A further object is to provide a method of stabilizing cellulose esters against deterioration of ultraviolet light.

The above objects are obtained by incorporating 2,4,-dibenzoylresorcinol in cellulose esters.

The cellulose ester plastic compositions are prepared by roll compounding the cellulose ester with a stabilizer. Our preferred range of proportions is 0.1 to 10% by weight of the cellulose ester. Various stabilizers, pigments, coloring agents, and the like, may also be incorporated in the cellulose ester.

After incorporating the stabilizer in the cellulose ester plastic, test specimens are exposed to artificial weathering in a modified Altas Twin-Arc Weather-Ometer (Anal. Chem., vol. 25, page 460 (1953)). After three days' conditioning at 73° F. and 50% relative humidity, the flexural strength and brittleness of the exposed specimens are measured by means of the Tour-Marshall test for stiffness in flexure (ASTM D747–58T). The samples are bent with the weathered surface on the convex side. The brittleness is defined as having developed when a break occurs at a bend angle of less than 90°. Measurement of inherent viscosity (J. Colloid Sci., vol. 1, page 261 (1946)) is made at 25° C. on acetone solutions of the plastic samples, before and after exposure. Concentration is 0.25 g. polymer per 100 ml. acetone. Although roll compounding is our preferred method of incorporating these ultraviolet inhibitors, other methods may be used such as dissolving the cellulose ester plastic and adding the stabilizer to the solution.

The following table gives the results of weathering tests on polybenzoylresorcinols. The results obtained are compared with standard cellulose ester light stabilizers, such as phenyl salicylate and resorcinol monobenzoate. Certain benzophenone light stabilizers are also included.

*Table I*

| Stabilizer | Stabilization Rating Based on Retardation of— | | |
|---|---|---|---|
| | Flexural Strength Loss | Embrittlement | Inherent Viscosity Loss |
| None | 1 | 1 | 1 |
| Phenyl Salicylate | 5 | 5 | 5 |
| Resorcinol Monobenzoate | 14 | 15 | 18 |
| 2,4-Dihydroxybenzophenone | 14 | 12 | 14 |
| 2,4,5-Trihydroxybenzophenone | 4 | 3 | 7 |
| 2-Hydroxy-4-methoxybenzophenone | 9 | 11 | |
| 2-Hydroxy-5-chlorobenzophenone | 2 | 3 | |
| 2,4-Dihydroxy-2'-carboxybenzophenone | 12 | 12 | 10 |
| 2,4-Dihydroxy-5-hexylbenzophenone | 11 | 11 | 15 |
| 2,5-Dihydroxybenzophenone | 7 | 8 | 22 |
| 2,4-Dibenzoylresorcinol | >20 | >20 | >20 |
| 4,6-Dibenzoylresorcinol | 9 | 9 | 3 |
| 2,4,6-Tribenzoylresorcinol | 11 | 8 | 15 |
| Tribenzoyl phloroglucinol | 13 | 11 | 15 |

2,4-dibenzoylresorcinol is shown to be superior to the other stabilizers shown in the above table.

The effectiveness of the stabilizers is measured by stabilization ratings defined as follows:

(1) Stabilization rating based on retardation of flexural strength loss is the ratio of the exposure time required to cause 25% loss of flexural strength in the stabilized composition to the exposure time required to cause 25% loss of flexural strength in the unstabilized composition.

(2) Stabilization rating based on retardation of embrittlement is the ratio of the exposure time required for the development of brittleness in the stabilized composition to the exposure time required for the development of brittleness in the unstabilized components.

(3) Stabilization rating based on retardation of viscosity loss is the ratio of the exposure time required for 25% loss of inherent viscosity in the stabilized composition to the exposure time required for 25% loss of inherent viscosity in the unstabilized composition.

On the basis of these definitions of stabilization, a value of 1.0 indicates no stabilization. Values greater than 1.0 indicate positive degrees of stabilization, the greater the value the more effective the stabilizer.

Certain of the compounds shown in the above table were prepared as follows:

4,6-dibenzoylresorcinol was prepared by the procedure of Doebner, Ann. 210, 259 (1881).

2,4-dibenzoylresorcinol was prepared by the method of Desai and Rodha, Proc. Indian Acad. Sci. 12A, 46–9 (1940); Chem. Abst. 34, 7875.

2,4,6-tribenzoylphloroglucinol was prepared by the method of Rosenmund and Lohfert, Ber. 61, 2601 (1928).

2,4,6-tribenzoylresorcinol was prepared by the method of Limaye, Rasayanan 2, 21 (1950); Chem. Abst. 45, 7049C (1951).

In the above table the cellulose ester composition used consisted of 100 parts of cellulose acetate butyrate (13% acetyl, 38% butyryl), 12 parts of dibutyl sebacate, and one part of stabilizer. Sheets 50 mils thick were compression molded for 10 minutes at 320° F. and cut into test specimens 2.5 x 0.5 inches. All types of cellulose esters may be used, however, such as cellulose acetate, cellulose propionate, cellulose butyrate, cellulose acetate propionate, cellulose nitrate, and the like, including other esters and mixed esters with suitable plasticizers.

The invention has been described in detail with particular reference to preferred embodiments thereof, but it will be understood that variations and modifications can be effected within the spirit and scope of the invention as described hereinabove and as defined in the appended claims.

We claim:

1. A cellulose organic acid ester plastic composition containing 0.1 to 10% of the weight of the cellulose ester of 2,4-dibenzoylresorcinol.
2. A cellulose acetate butyrate plastic composition containing 0.1 to 10% of the weight of the cellulose ester of 2,4-dibenzoylresorcinol.
3. A cellulose acetate plastic composition containing 0.1 to 10% of the weight of the cellulose ester of 2,4-dibenzoylresorcinol.
4. A cellulose butyrate plastic composition containing 0.1 to 10% of the weight of the cellulose ester of 2,4-dibenzoylresorcinol.
5. A cellulose acetate propionate plastic composition containing 0.1 to 10% of the weight of the cellulose ester of 2,4-dibenzoylresorcinol.
6. A cellulose propionate plastic composition containing 0.1 to 10% of the weight of the cellulose ester of 2,4-dibenzoylresorcinol.

References Cited in the file of this patent

UNITED STATES PATENTS

| | | |
|---|---|---|
| 2,900,361 | Havens | Aug. 18, 1959 |
| 2,974,053 | Suchow | Mar. 7, 1961 |